United States Patent
Goncalves et al.

(10) Patent No.: US 11,400,756 B2
(45) Date of Patent: Aug. 2, 2022

(54) TIRE FOR HEAVY GOODS VEHICLE

(71) Applicant: Compagnie Generale Des Etablissements Michelin, Clermont-Ferrand (FR)

(72) Inventors: Olivier Goncalves, Clermont-Ferrand (FR); Muhamed Jesbeer Kallungal Abdul Jaleel, Clermont-Ferrand (FR); Perrine Vallat, Clermont-Ferrand (FR)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 401 days.

(21) Appl. No.: 16/624,723

(22) PCT Filed: Jun. 21, 2018

(86) PCT No.: PCT/FR2018/051509
§ 371 (c)(1),
(2) Date: Dec. 19, 2019

(87) PCT Pub. No.: WO2018/234708
PCT Pub. Date: Dec. 27, 2018

(65) Prior Publication Data
US 2021/0155039 A1 May 27, 2021

(30) Foreign Application Priority Data
Jun. 22, 2017 (FR) ........................ 1755729

(51) Int. Cl.
*B60C 1/00* (2006.01)
*B60C 11/00* (2006.01)
(Continued)

(52) U.S. Cl.
CPC .......... *B60C 1/0016* (2013.01); *B60C 11/005* (2013.01); *C08K 3/04* (2013.01);
(Continued)

(58) Field of Classification Search
CPC . B60C 1/0016; B60C 11/005; B60C 2200/06; C08K 3/04; C08K 3/36; C08K 9/10
See application file for complete search history.

(56) References Cited

U.S. PATENT DOCUMENTS

2014/0378575 A1* 12/2014 Sevignon ............ C08K 5/0016
523/156

FOREIGN PATENT DOCUMENTS

WO      2011/076635 A1      6/2011
WO   WO-2011076635 A1 *    6/2011  .......... B60C 1/0016
(Continued)

OTHER PUBLICATIONS

International Search Report issued in PCT/FR2018/051509 dated Oct. 10, 2018.

*Primary Examiner* — Yung-Sheng M Tsui
(74) *Attorney, Agent, or Firm* — Dickinson Wright PLLC; Steven C. Hurles

(57) ABSTRACT

The tire has a radial carcass reinforcement intended to equip vehicles carrying heavy loads and running at sustained speed. The tire comprises a crown reinforcement, itself capped radially with a tread joined to two beads via two sidewalls. The tread comprises at least two radially superposed layers of polymeric compound, a radially outer first layer that comes into contact with the ground and a radially inner second layer. The second layer has a composition based on at least a diene elastomer, a reinforcing filler comprising predominantly a filler covered at least partially by silica, an agent for coupling the filler with the elastomer and a crosslinking system. The dispersion of the filler in the elastomeric matrix has a Z value greater than or equal to 70.

13 Claims, 1 Drawing Sheet

(51) Int. Cl.
  *C08K 3/04* (2006.01)
  *C08K 3/36* (2006.01)
  *C08K 9/10* (2006.01)
(52) U.S. Cl.
  CPC ............... *C08K 3/36* (2013.01); *C08K 9/10* (2013.01); *B60C 2011/0033* (2013.01); *B60C 2200/06* (2013.01)

(56) References Cited

FOREIGN PATENT DOCUMENTS

WO      2014/102136 A1      7/2014
WO      WO-2014102136 A1 *  7/2014   ........... B60C 1/0016

* cited by examiner

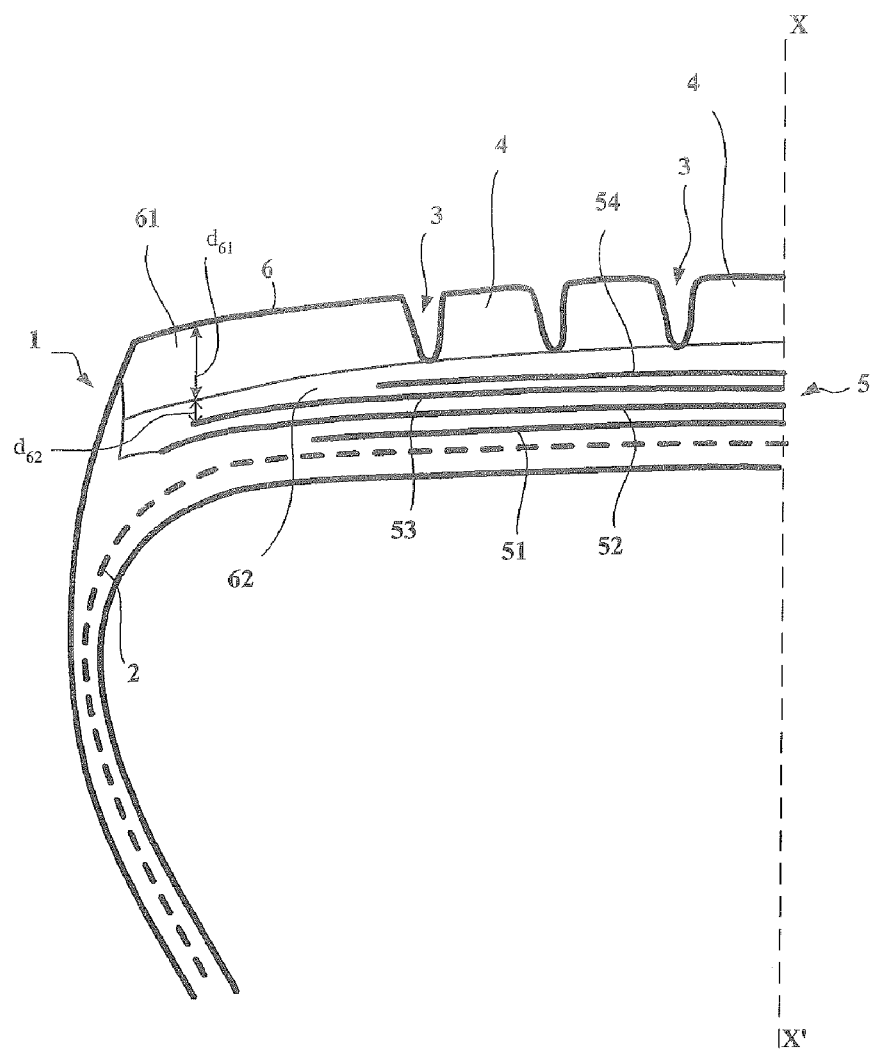

TIRE FOR HEAVY GOODS VEHICLE

CROSS-REFERENCE TO RELATED APPLICATIONS

The present application claims priority to PCT International patent Application No. PCT/FR2018/051509, filed on Jun. 21, 2018, which claims priority to FR 1755729.

BACKGROUND

1. Field of the Invention

The present disclosure relates to a tire intended to equip vehicles carrying heavy loads and running at sustained speed, such as, for example, lorries, tractors, trailers or road buses, aircraft, etc., and more particularly to the tread of such a tire, intended to come into contact with the ground by means of a tread surface and to be worn away.

2. Related Art

In tires of heavy-duty type, the carcass reinforcement is generally anchored on either side in the region of the bead and is surmounted radially by a crown reinforcement composed of at least two layers that are superposed and formed of threads or cords which are parallel in each layer and crossed from one layer to the next, forming angles of between 10° and 45° with the circumferential direction. Said working layers that form the working reinforcement may furthermore be covered with at least one layer, referred to as protective layer, formed of reinforcing elements which are advantageously metal and extensible and are referred to as elastic reinforcing elements. It may also comprise a layer of metal threads or cords having low extensibility, forming an angle of between 45° and 90° with the circumferential direction, this ply, referred to as the triangulation ply, being situated radially between the carcass reinforcement and the first crown ply, referred to as the working ply, which are formed of parallel threads or cords lying at angles not exceeding 45° in terms of absolute value. The triangulation ply forms a triangulated reinforcement with at least said working ply, this reinforcement having little deformation under the various stresses to which it is subjected, the triangulation ply essentially serving to absorb the transverse compressive forces to which all the reinforcing elements in the crown region of the tire are subjected.

Radially on the outside of the crown reinforcement is the tread usually made up of polymeric materials intended to come into contact with the ground in the contact patch in which the tire makes contact with the ground.

Cords are said to be inextensible when said cords exhibit, under a tensile force equal to 10% of the breaking force, a relative elongation at most equal to 0.2%.

Cords are said to be elastic when said cords exhibit, under a tensile force equal to the breaking load, a relative elongation at least equal to 3% with a maximum tangent modulus of less than 150 GPa.

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively.

In the following text, the expressions "radially inner/radially on the inside" and "radially outer/radially on the outside" mean "closer to" and "further away from" the axis of rotation of the tire, respectively. "Axially inner/axially on the inside" and "axially outer/axially on the outside" mean "closer to" and "further away from" the equatorial plane of the tire, respectively, the equatorial plane of the tire being the plane passing through the middle of the tread surface of the tire and perpendicular to the axis of rotation of the tire.

Some current tires, referred to as "road" tires, are intended to run at high speed and over increasingly long journeys, as a result of the improvement in the road network and of the growth of the motorway network throughout the world. The combined conditions under which such a tire is called upon to run undoubtedly enable an increase in the number of kilometres travelled since the wear on the tire is reduced, but, on the other hand, the endurance of this tire and in particular of the crown reinforcement is detrimentally affected.

This is because there are stresses in the crown reinforcement and, more particularly, shear stresses between the crown layers, combined with a not-insignificant rise in the operating temperature at the ends of the axially shortest crown layer, which have the effect of causing cracks in the rubber to appear and propagate at said ends. This problem exists in the case of edges of two layers of reinforcing elements, said layers not necessarily being radially adjacent.

In order to limit excessive temperature increases at the crown of the tire, the materials of which the tread is made are advantageously chosen to have hysteresis losses suited to the operating conditions of the tire.

Furthermore, in order to increase the life of the tire still further, it is common practice to choose polymeric materials for making the tread that have improved wear resistance properties. Because such materials usually have an adverse effect on hysteresis properties it is also known practice to make the tread of a tire from a radial superposition of two different materials in order to obtain a wear properties-hysteresis properties compromise that is satisfactory for the applications envisaged.

There is thus a constant search to improve the properties of tires and in particular their wear resistance and, conventionally, the improvement in the wear resistance is known to be reflected by an increase in rolling resistance, and therefore in energy consumption.

It is known that, in order to obtain the optimum reinforcing properties imparted by a filler in a tire tread, and thus to obtain high wear resistance, it is generally advisable for this filler to be present in the elastomeric matrix in a final form that is both as finely divided as possible and as uniformly distributed as possible. However, such conditions can be achieved only if this filler has a very good ability, on the one hand, to be incorporated into the matrix during the mixing with the elastomer and to deagglomerate, and, on the other hand, to disperse uniformly in this matrix.

In a known way, carbon black has such abilities, which is not generally the case with inorganic fillers, in particular silicas. This is because, for reciprocal affinity reasons, these inorganic filler particles have an unfortunate tendency to clump together in the elastomeric matrix. These interactions have the harmful consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the raw state of the rubber compositions and thus to make their processability more difficult than in the presence of carbon black.

There is therefore a need to have a filler, providing the hysteresis level of silica and the reinforcing character of a filler such as carbon black, in rubber compositions.

This is why reinforcing fillers covered at least partially by silica are particularly beneficial, in particular reinforcing fillers consisting of carbon black covered at least partially by silica, such as described, especially, in the publications WO98/13428 and EP 711 805 B1, or reinforcing fillers consisting of metal oxide covered at least partially by silica such as described, especially, in the publication FR2888243.

The advantage of using fillers covered at the surface by a silica, especially with a high specific surface area, lies mainly in the possibility of increasing the number of bonds of the silica with the elastomer and therefore of increasing the level of reinforcement thereof.

Document EP0997490 discloses compositions for tires used for heavy-duty vehicles which comprise, as reinforcing filler, carbon blacks covered with silica making it possible, at constant filler content, either to improve the rolling resistance at constant wear resistance, or to improve the wear resistance at constant rolling resistance.

SUMMARY OF THE INVENTION

The Applicant has surprisingly discovered that tires used for heavy-duty vehicles, of which a radially inner portion of the tread consists of a composition based on diene elastomer and on filler covered at least partially by silica, and having a very good dispersion of the reinforcing filler in the elastomeric matrix, made it possible to obtain tires having both improved thermal properties but also having improved tire life properties.

In order to obtain a good dispersion of the filler in the elastomeric matrix, it is possible in particular to mix the elastomer and the filler in the "liquid" phase. To do so, use was made of an elastomer in latex form, which is in the form of water-dispersed elastomer particles, and an aqueous dispersion of the filler, that is to say a filler dispersed in water, commonly referred to as a "slurry". Certain processes in particular, such as those described in document U.S. Pat. No. 6,048,923, make it possible to obtain a masterbatch of elastomer and filler that has very good dispersion of the filler in the elastomeric matrix, greatly improved compared to the dispersion of the filler in the elastomeric matrix that may be obtained during the solid-phase mixing of elastomer and reinforcing filler, which are also suitable for reinforcing fillers covered at least partially by silica as shown in document WO 2012/037244.

The subject of the disclosure is thus a tire having a radial carcass reinforcement intended to equip vehicles carrying heavy loads and running at sustained speed, comprising a crown reinforcement, itself capped radially with a tread joined to two beads via two sidewalls, said tread comprising at least two radially superposed layers of polymeric compound, a radially outer first layer that comes into contact with the ground and a radially inner second layer, characterized the second layer has a composition based on at least a diene elastomer, a reinforcing filler comprising predominantly a filler covered at least partially by silica, an agent for coupling the filler with the elastomer and a crosslinking system, the dispersion of the filler in the elastomeric matrix having a Z value greater than or equal to 70.

According to an embodiment variant of the disclosure, the tread comprises a third layer radially on the inside of the second layer, the third layer having a composition identical to or different from that of the second layer.

Advantageously, the filler covered at least partially by silica constitutes at least 60% by weight of the total reinforcing filler of the composition; preferably the filler covered at least partially by silica constitutes at least 80% by weight of the total reinforcing filler of the composition.

The term "masterbatch" is understood to mean, in that which follows: an elastomer-based composite into which a filler and optionally other additives have been introduced.

Measurements and Tests

The rubber compositions are characterized, before and after curing, as indicated below.

Dispersion

In a known way, the dispersion of filler in an elastomeric matrix can be represented by the Z value, which is measured, after crosslinking, according to the method described by S. Otto et al. in Kautschuk Gummi Kunststoffe, 58 Jahrgang, NR 7-8/2005, in agreement with standard ISO 11345.

The calculation of the Z value is based on the percentage of surface area in which the filler is not dispersed ("% undispersed surface area"), as measured by the "disperGRADER+" device supplied, with its operating instructions and "disperDATA" operating software, by Dynisco, according to the equation:

$$Z=100-(\% \text{ undispersed surface area})/0.35$$

The percentage of undispersed surface area is, for its part, measured using a camera which observes the surface of the sample under incident light at 30°. The light points are associated with filler and with agglomerates, while the dark points are associated with the rubber matrix; digital processing converts the image into a black and white image and makes it possible to determine the percentage of undispersed surface area, as described by S. Otto in the abovementioned document.

The higher the Z value, the better the dispersion of the filler in the elastomeric matrix (a Z value of 100 corresponding to a perfect dispersion and a Z value of 0 to a mediocre dispersion). A Z value of greater than or equal to 80 will be regarded as corresponding to a surface having very good dispersion of the filler in the elastomeric matrix.

Dynamic Properties

The dynamic properties, including tan(δ)max, are measured on a viscosity analyser (Metravib V A4000) according to standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under the standard temperature conditions according to standard ASTM D 1349-99, is recorded. A peak-to-peak strain amplitude sweep is carried out from 0.1% to 100% (outward cycle) and then from 100% to 0.1% (return cycle). The result made use of is the loss factor tan(δ). For the outward cycle, the maximum value of tan(δ) observed (tan(δ)max) is indicated. The tan(δ)max values given below are measured at 100° C.

Description of the Wear Resistance Test

The wear tests were carried out on tires fitted to the front position of a lorry of towing type. These wear tests are carried out for two tires of a control composition T and for two tires of a composition I according to the invention. The wear rolling is carried out over a distance of 30 000 km. The wear performance expressed relative to a base 100 of the control is calculated by the ratio between the mean height loss measured for the two tires of the control composition T and the mean height loss for the two tires of the composition I. A score of greater than 100 indicates an improved wear performance for the tires of composition I compared to the tires of composition T.

The present disclosure relates to a tire having a radial carcass reinforcement intended to equip vehicles carrying heavy loads and running at sustained speed, comprising a crown reinforcement, itself capped radially with a tread joined to two beads via two sidewalls, said tread comprising at least two radially superposed layers of polymeric compound, a radially outer first layer that comes into contact with the ground and a radially inner second layer, characterized the second layer has a composition based on at least a diene elastomer, a reinforcing filler comprising predominantly a filler covered at least partially by silica, an agent for coupling the filler with the elastomer and a crosslinking system, wherein the dispersion of the filler in the elastomeric matrix has a Z value greater than or equal to 70.

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The Applicant companies have first of all been able to demonstrate that the presence of a composition based on at least a diene elastomer, a reinforcing filler comprising predominantly a filler covered at least partially by silica, an agent for coupling the filler with the elastomer and a crosslinking system, the dispersion of the filler in the elastomeric matrix having a Z value greater than or equal to 70, as radially innermost material of the tread leads to a compromise between the wear-resistance properties and increases in temperature at the crown of the tire that is satisfactory for the road uses as described hereinabove.

According to one advantageous variant of the disclosure, the ratio of the volume of the layer of the second elastomeric compound to the sum of the volumes of the first and second elastomeric compounds is between 25% and 70%.

The profile of the second elastomeric compound, when viewed along a meridian section of the tire, is such that it appears substantially simultaneously over the entire width of the tread as said tread wears. The designer of the tire will know how to define such a profile according to the size and use of the tire.

Further advantageously, the ratio of the thickness, measured along the radial direction at the end of the radially outermost working layer in a meridian section of the tire, of the layer of the second elastomeric compound to the sum of the thicknesses, measured along the radial direction at the end of the radially outermost working layer in a meridian section of the tire, of the first and second elastomeric compounds is between 15% and 50%.

An advantageous variant of the disclosure further provides for the presence of a layer of a third elastomeric compound radially on the inside of the second elastomeric compound and in contact therewith, having a composition identical to or different from that of the second layer.

In the advantageous variant where this third layer also has a composition based on at least a diene elastomer, a reinforcing filler comprising predominantly a filler covered at least partially by silica, an agent for coupling the filler with the elastomer and a crosslinking system, the dispersion of the filler in the elastomeric matrix having a Z value greater than or equal to 70, the presence of this third layer may make it possible to further reduce the increases in temperature of the tread during the desired use of the tire in particular when the second elastomeric compound has hysteresis properties that tend to increase said temperature.

More particularly, in the case of a tire having a tread pattern that consists of parallel ribs, the third layer of elastomeric compound is advantageously discontinuous. It is then preferentially interrupted under the grooves.

According to this last embodiment, it is advantageously possible to regroove the tread pattern before envisaging retreading without the risk of seeing said third layer of elastomeric compound become visible at the surface of the tread.

Advantageously, according to this last embodiment, the ratio of the volume of the layer of the second elastomeric compound to the sum of the volumes of the three elastomeric compounds is between 20% and 40%.

Further advantageously, according to this last embodiment, the ratio of the volume of the layer of the third elastomeric compound to the sum of the volumes of the three elastomeric compounds is between 10% and 30%.

According to this last embodiment, the ratio of the thickness, measured along the radial direction at the end of the radially outermost working layer in a meridian section of the tire, of the layer of the second elastomeric compound to the sum of the thicknesses, measured along the radial direction at the end of the radially outermost working layer in a meridian section of the tire, of the three elastomeric compounds is advantageously between 10% and 30%.

Further advantageously, according to this last embodiment, the ratio of the thickness, measured along the radial direction at the end of the radially outermost working layer in a meridian section of the tire, of the layer of the third elastomeric compound to the sum of the thicknesses, measured along the radial direction at the end of the radially outermost working layer in a meridian section of the tire, of the three elastomeric compounds is between 10% and 30%.

According to the invention, the abovementioned volume and thickness measurements are performed on tires in the new condition which have not been driven on and which therefore do not display any tread wear.

According to one embodiment of the disclosure, the crown reinforcement of the tire is formed of at least two working crown layers of inextensible reinforcing elements that are crossed from one layer to the other, forming angles of between 10° and 45° with the circumferential direction.

According to other embodiments of the disclosure, the crown reinforcement also comprises at least one layer of circumferential reinforcing elements.

One embodiment of the disclosure also provides for the crown reinforcement to be supplemented radially on the outside by at least one additional layer, referred to as a protective layer, of reinforcing elements, referred to as elastic reinforcing elements, that are oriented relative to the circumferential direction at an angle of between 10° and 45° and in the same direction as the angle formed by the inextensible elements of the working layer which is radially adjacent thereto.

According to any one of the embodiments of the invention mentioned above, the crown reinforcement may be further supplemented, radially on the inside between the carcass reinforcement and the radially inner working layer closest to said carcass reinforcement, by a triangulation layer made of metal inextensible reinforcing elements that are made of steel and form, with the circumferential direction, an angle of more than 60° and in the same direction as that of the angle formed by the reinforcing elements of the layer radially closest to the carcass reinforcement.

Diene Elastomer

As is customary, the terms "elastomer" and "rubber", which are interchangeable, are used without distinction in the text.

The composition in accordance with the invention comprises at least one first diene elastomer and optionally a second elastomer identical to or different from the first, which thus may or may not be a diene elastomer.

A "diene" elastomer or rubber should be understood, in a known way, as meaning an elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is generally understood to mean a diene elastomer resulting at least in part from conjugated diene monomers having a content of moieties or units of diene origin (conjugated dienes) which is greater than 15% (mol %); thus it is that diene elastomers such as butyl rubbers or copolymers of dienes and of α-olefins of EPDM type do not fall under the preceding definition and may especially be termed "essentially saturated" diene elastomers (low or very low content, always less than 15%, of moieties of diene origin). In the category of "essentially unsaturated" diene elastomers, "highly unsaturated" diene elastomer is understood in particular to mean a diene elastomer having a content of moieties of diene origin (conjugated dienes) which is greater than 50%.

Among these diene elastomers, a distinction is furthermore made between natural rubber and synthetic elastomers.

In the expression "synthetic diene elastomers capable of being used in accordance with the invention", the term "diene elastomer" is intended more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalizing agent. For coupling to carbon black, mention may for example be made of functional groups comprising a C—Sn bond or amino functional groups, such as aminobenzophenone, for example; for coupling to an inorganic filler such as silica, mention may for example be made of silanol functional groups or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To summarize, the synthetic diene elastomer or elastomers according to the invention are preferentially selected from the group of highly unsaturated diene elastomers consisting of polybutadienes (abbreviated to BRs), synthetic polyisoprenes (IRs), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

As was specified above, liquid-phase compounding processes are preferentially used to make it possible to obtain masterbatches based on diene elastomer and on reinforcing filler that have a very good dispersion of the reinforcing filler in the elastomer. Thus, especially for the preparation of the masterbatch of diene elastomer and filler covered at least partially by silica, use will more particularly be made of a diene elastomer latex, the elastomer latex being a particular form of the elastomer which exists in the form of water-dispersed elastomer particles.

The invention thus preferentially relates to latices of diene elastomers, the diene elastomers being those defined previously.

More particularly, for natural rubber (NR), which is particularly suitable for the invention, this natural rubber exists in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latices referred to as "field latices", the natural rubber latices referred to as "concentrated natural rubber latices", epoxidized latices (ENRs), deproteinized latices or else prevulcanized latices. Natural rubber field latex is a latex to which ammonia has been added in order to prevent premature coagulation and concentrated natural rubber latex corresponds to a field latex which has undergone a treatment corresponding to a washing, followed by a further concentration. The various categories of concentrated natural rubber latices are listed in particular according to standard ASTM D 1076-06. Singled out in particular among these concentrated natural rubber latices are concentrated natural rubber latices of the grade referred to as: "HA" (high ammonia) and of the grade referred to as "LA"; for the invention, use will advantageously be made of concentrated natural rubber latices of HA grade.

The NR latex can be physically or chemically modified beforehand (centrifugation, enzymatic treatment, chemical modifier, etc.).

The latex can be used directly or be diluted beforehand in water to facilitate the use thereof.

Thus, as synthetic elastomer latex, the latex can in particular consist of a synthetic diene elastomer already available in the form of an emulsion (for example, a butadiene/styrene copolymer, SBR, prepared in emulsion) or consist of a synthetic diene elastomer initially in solution (for example, an SBR prepared in solution) which is emulsified in a mixture of organic solvent and water, generally by means of a surfactant.

A latex of SBR, especially an SBR prepared in emulsion ("ESBR") or an SBR prepared in solution ("SSBR"), and more particularly an SBR prepared in emulsion, is particularly suitable for the invention.

There are two main types of processes for the emulsion copolymerization of styrene and butadiene, one of them, also known as hot process (carried out at a temperature close to 50° C.), being suitable for the preparation of highly branched SBRs, whereas the other, also known as cold process (carried out at a temperature which can range from 15° C. to 40° C.), makes it possible to obtain more linear SBRs.

For a detailed description of the effectiveness of several emulsifiers which can be used in said hot process (as a function of the contents of said emulsifiers), reference may be made, for example, to the two papers by C. W. Carr, I. M. Kolthoff, E. J. Meehan, University of Minnesota, Minneapolis, Minn. which appeared in the Journal of Polymer Science of 1950, Vol. V, no. 2, pp. 201-206, and of 1951, Vol. VI, no. 1, pp. 73-81.

Regarding comparative exemplary embodiments of said cold process, reference may be made, for example, to the paper in Industrial and Engineering Chemistry, 1948, Vol. 40, no. 5, pp. 932-937, E. J. Vandenberg, G. E. Hulse, Hercules Powder Company, Wilmington, Del. and to the paper in Industrial and Engineering Chemistry, 1954, Vol. 46, no. 5, pp. 1065-1073, J. R. Miller, H. E. Diem, B. F. Goodrich Chemical Co., Akron, Ohio.

In the case of an SBR (ESBR or SSBR) elastomer, use is especially made of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It will be noted that it is possible to envisage using one or more natural rubber latices as a blend, one or more synthetic rubber latices as a blend, or a blend of one or more natural rubber latices with one or more synthetic rubber latices.

According to a variant embodiment of the invention, the composition comprises a second elastomer which may or may not be a diene elastomer; in the latter case, the following are particularly suitable: non-diene butyl elastomers such as poly(isobutylene) homopolymers or copolymers based on poly(isobutylene) (of course, when it is a question of copolymers with isoprene, the diene elastomers described above are recalled), and also the halogenated derivatives, in particular generally brominated or chlorinated derivatives, of these poly(isobutylene) homopolymers and copolymers based on poly(isobutylene).

Among the non-diene elastomers, copolymers of isobutylene and of styrene derivatives, such as brominated isobutylene/methylstyrene (BIMS) copolymers, among which especially is the elastomer named Exxpro sold by Exxon, are also suitable.

Mention may also be made, as non-diene elastomer particularly suitable for the invention, of non-diene thermoplastic elastomers (TPEs).

Advantageously, the fraction by weight of the first diene elastomer in the elastomeric matrix is greater than or equal to 50% and preferably greater than or equal to 60%.

Fillers

As reinforcing filler, predominantly any filler covered at least partially by silica is used. Thus, the filler covered at least partially by silica may in particular consist of a carbon black, metal hydroxides, especially magnesium or aluminium hydroxides, and crosslinked polymer particles.

The carbon blacks covered partially or completely by silica by a post-treatment, or the carbon blacks modified in situ by silica such as, non-limitingly, the fillers sold by Cabot Corporation under the name Ecoblack™ CRX 2000 or CRX4000 or CRX2125, or the fillers described in publications US2003040553 and WO9813428, are particularly suitable.

Such a reinforcing filler preferentially contains a content of silica of 10% by weight of the reinforcing filler.

Such fillers may be obtained according to the method for covering carbon black by silica as described in examples 1 and 2 of patent application WO00/05312.

Synthetic metal hydroxides covered by silica, the metal M of which is selected from the group consisting of Al, Fe, Mg, and mixtures of these metals, are also particularly suitable. M preferably represents Al or Mg as described especially in publications WO06/002993 or WO07/003408.

This filler covered at least partially by silica constitutes, for the most part, the reinforcing filler of the composition, that is to say that it constitutes at least 50% by weight of all the reinforcing fillers of the composition. It may advantageously constitute more than 60% by weight of the total reinforcing filler, preferentially more than 80% by weight of the total reinforcing filler, more preferentially still more than 95% by weight of the total reinforcing filler.

It may be used alone or in a blend with another organic filler such as carbon black or functionalized polyvinylaromatic organic fillers such as described in applications WO-A-2006/069792 and WO-A-2006/069793, and/or one or more reinforcing inorganic fillers such as silica and/or another filler covered at least partially by silica.

All carbon blacks, especially blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), for instance the N115, N134, N234, N326, N330, N339, N347 or N375 blacks, or else, depending on the applications targeted, the blacks of higher series (for example N660, N683 or N772).

"Reinforcing inorganic filler" should be understood, in the present application, by definition, as meaning any inorganic or mineral filler (whatever its colour and its origin (natural or synthetic)), also known as "white filler", "clear filler" or indeed even "non-black filler", in contrast to carbon black, capable of reinforcing by itself alone, without means other than an intermediate coupling agent, a rubber composition intended for the manufacture of tire, in other words capable of replacing, in its reinforcing role, a conventional tire-grade carbon black; such a filler is generally characterized, in a known way, by the presence of hydroxyl (—OH) groups at its surface.

The physical state in which the reinforcing inorganic filler is provided is not important, whether it be in the form of a powder, of micropearls, of granules, of beads or any other appropriate densified form. Needless to say, the term "reinforcing inorganic filler" also refers to mixtures of different reinforcing inorganic fillers, in particular of highly dispersible siliceous and/or aluminous fillers, as described below.

Mineral fillers of the siliceous type, especially silica ($SiO_2$), or of the aluminous type, especially alumina ($Al_2O_3$), are suitable in particular as reinforcing inorganic fillers. The silica used can be any reinforcing silica known to a person skilled in the art, in particular any precipitated or fumed silica having a BET surface area and also a CTAB specific surface area both of less than 450 $m^2$/g, preferably from 30 to 400 $m^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

According to a variant embodiment of the disclosure, the filler covered at least partially by silica represents at least 60% by weight of the reinforcing filler in the composition.

Preferably, the filler covered at least partially by silica represents at least 80% by weight of the reinforcing filler in the composition, more preferentially at least 95% by weight of the total reinforcing filler of the composition.

According to another variant embodiment of the disclosure, the filler covered at least partially by silica constitutes the only reinforcing filler of the composition.

Preferentially, the content of total reinforcing filler is between 20 and 200 phr, more preferentially between 25 and 150 phr and more preferentially still between 25 and 100 phr, the optimum being, in a known way, different depending on the particular applications targeted: the level of reinforcement expected with regard to a bicycle tire, for example, is of course less than that required with regard to a tire capable of running at high speed in a sustained manner, for example a motorcycle tire, a tire for a passenger vehicle or a tire for a utility vehicle, such as a heavy-duty vehicle.

According to a preferential embodiment of the disclosure, use is made, as reinforcing filler covered at least partially by silica, of carbon black covered at least partially by silica at a content ranging from 25 to 90 phr, and this can preferably be combined with an organic filler, in particular carbon black, or inorganic filler, in particular silica, the content of which ranges from 1 to 50 phr, more particularly the total filler of the composition comprising carbon black covered at least partially by silica, the content of which ranges from 30 to 75 phr and an organic filler, in particular carbon black, or an inorganic filler, in particular silica, the content of which ranges from 1 to 30 phr.

According to another preferential variant of the disclosure, the composition solely comprises carbon black covered at least partially by silica at a content ranging from 25 to 90 phr, and more preferentially the content ranges from 30 to 75 phr.

According to a preferred embodiment of the disclosure, in order to couple the filler covered at least partially by silica, or even a reinforcing inorganic filler if need be, to the diene elastomer, use is made of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

Use is made in particular of silane polysulfides, referred to as "symmetrical" or "asymmetrical" depending on their specific structure, such as described, for example, in applications WO 03/002648 (or US 2005/016651) and WO 03/002649 (or US 2005/016650).

Suitable in particular, without the definition below being limiting, are silane polysulfides corresponding to the following general formula (I):

$$Z\text{-}A\text{-}Sx\text{-}A\text{-}Z, \text{ in which:} \qquad (I)$$

x is an integer from 2 to 8 (preferably from 2 to 5);

the A symbols, which are identical or different, represent a divalent hydrocarbon-based radical (preferably a C1-C18 alkylene group or a C6-C12 arylene group, more particularly a C1-C10, especially C1-C4, alkylene, in particular propylene);

the Z symbols, which are identical or different, correspond to one of the three formulae below:

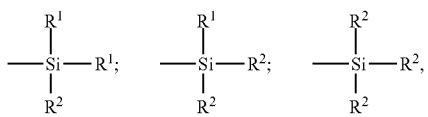

in which:
- the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
- the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferentially still a group chosen from $C_1$-$C_4$ alkoxyls, in particular methoxyl and ethoxyl).

In the case of a mixture of alkoxysilane polysulfides corresponding to the above formula (I), especially customary commercially available mixtures, the mean value of "x" is a fractional number preferably of between 2 and 5, more preferentially close to 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in the abovementioned patent application WO 02/083782 (or U.S. Pat. No. 7,217,751).

Mention will especially be made, as examples of coupling agents other than an alkoxysilane polysulfide, of bifunctional POSs (polyorganosiloxanes), or else of hydroxysilane polysulfides ($R^2$=OH in the above formula I), such as described, for example, in patent applications WO 02/30939 (or U.S. Pat. No. 6,774,255), WO 02/31041 (or US 2004/051210) and WO2007/061550, or else of silanes or POSs bearing azodicarbonyl functional groups, such as described, for example, in patent applications WO 2006/125532, WO 2006/125533 and WO 2006/125534.

Mention will be made, as examples of other silane sulfides, for example, of silanes bearing at least one thiol (—SH) functional group ("mercaptosilanes") and/or at least one blocked thiol functional group, such as described, for example, in the patents or patent applications U.S. Pat. No. 6,849,754, WO 99/09036, WO 2006/023815, WO 2007/098080, WO 2010/072685 and WO 2008/055986.

Of course, use might also be made of mixtures of the coupling agents described above, as described in particular in the abovementioned application WO 2006/125534.

The content of coupling agent is advantageously less than 20 phr, it being understood that it is generally desirable to use as little as possible thereof. Typically, the content of coupling agent represents from 0.05% to 10% by weight relative to the amount of reinforcing inorganic filler, preferably from 0.1% to 7% by weight and more preferentially still from 0.2% to 5% by weight.

This content is easily adjusted by those skilled in the art depending on the content of filler used in the composition.

It will be noted that, according to another preferred embodiment of the invention, the composition does not comprise an agent for coupling the filler covered at least partially by silica to the diene elastomer of the composition.

These compositions can also comprise, in addition to the coupling agents, coupling activators, covering agents (for example comprising the Y function alone) for the reinforcing inorganic filler or more generally processing aids capable, in a known way, by virtue of an improvement in the dispersion of the inorganic filler in the rubber matrix and of a lowering of the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

Other Possible Additives

The rubber compositions in accordance with the invention optionally also comprise all or a portion of the normal additives customarily used in elastomer compositions intended especially for the manufacture of treads, such as, for example, pigments, protective agents, such as antiozone waxes, chemical antiozonants or antioxidants, anti-fatigue agents, reinforcing resins, or methylene acceptors (for example novolac phenolic resin) or donors (for example HMT or H3M).

According to a preferential embodiment, the composition according to the invention comprises less than 15 phr of plasticizing agents, preferably less than 5 phr, and more preferentially still the composition does not contain any plasticizing agents. The plasticizing agents conventionally used in such compositions are solid hydrocarbon-based resins (or plasticizing resin), extender oils (or plasticizing oil), or the mixture of the two.

Crosslinking System

The crosslinking system is preferentially a vulcanization system, i.e. a system based on sulfur (or on a sulfur donor) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

Use may be made, as (primary or secondary) accelerator, of any compound that is capable of acting as accelerator of the vulcanization of diene elastomers in the presence of sulfur, notably accelerators of the thiazole type and also derivatives thereof, or accelerators of thiuram or zinc dithiocarbamate type. These accelerators are, for example, selected from the group consisting of 2-mercaptobenzothiazyl disulfide (abbreviated to "MBTS"), tetrabenzylthiuram disulfide ("TBZTD"), N-cyclohexyl-2-benzothiazole-sulfenamide ("CBS"), N,N-dicyclohexyl-2-benzothiazole-sulfenamide ("DCBS"), N-(tert-butyl)-2-benzothiazole-sulfenamide ("TBBS"), N-(tert-butyl)-2-benzothiazolesulfenimide ("TBSI"), zinc dibenzyldithiocarbamate ("ZBEC") and the mixtures of these compounds. Preferably, use is made of a primary accelerator of the sulfenamide type.

Manufacture of the Rubber Compositions and Masterbatches

The rubber compositions of the disclosure are manufactured in appropriate mixers, using two successive phases of preparation according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., during which finishing phase the crosslinking or vulcanization system is incorporated.

According to a preferential embodiment of the disclosure, all the base constituents of the compositions of the invention, with the exception of the vulcanization system, are intimately incorporated, by kneading, during the first "non-productive" phase, that is to say that at least these various base constituents are introduced into the mixer and are thermomechanically kneaded, in one or more steps, until the maximum temperature of between 130° C. and 200° C., preferably of between 145° C. and 185° C., is reached.

According to a preferential embodiment of the disclosure, the diene elastomer and the filler covered at least partially by silica are mixed with the base constituents of the compositions of the invention, with the exception of the vulcanization system, in the form of a masterbatch which was prepared beforehand.

Preferentially, this masterbatch is produced in the "liquid" phase. To do this, use was made of the diene elastomer in the form of latex which is in the form of elastomer particles dispersed in water, and of an aqueous dispersion of the filler covered at least partially by silica, i.e. a filler dispersed in water, commonly referred to as a "slurry". More preferentially still, the steps of the process described in document U.S. Pat. No. 6,048,923 will be followed, which process consists in particular in incorporating a continuous stream of a first fluid consisting of the elastomer latex in the compounding zone of a coagulation reactor, in incorporating a second continuous stream of a second fluid consisting of the aqueous dispersion of the filler under pressure in the compounding zone, so as to form a mixture with the elastomer latex; the compounding of these two fluids being sufficiently energetic to make it possible to virtually completely coagulate the elastomer latex with the filler before the outlet orifice of the coagulation reactor, and in then drying the coagulum obtained.

It will in particular be noted that, in the case of the incorporation of a second elastomer and/or of a second organic or inorganic filler, this or these incorporations can be carried out simultaneously with the introduction into the mixer of the other constituents (especially the masterbatch) but also advantageously that this or these incorporations can be offset in time from a few tens of seconds to a few minutes.

It will be noted that, in the case of an addition of an organic or inorganic filler and a second elastomer, these can be introduced separately or in the form of a second masterbatch containing the second elastomer and the organic or inorganic filler. In the case of introduction of the second elastomer alone and the organic or inorganic filler alone, offset in time from a few tens of seconds to a few minutes, the organic or inorganic filler can be introduced before, after or simultaneously with the second elastomer.

By way of example, the first (non-productive) phase is carried out in a single thermomechanical step during which all the necessary constituents (if appropriate in the form of a masterbatch as specified above) and various other additives, with the exception of the vulcanization system, are introduced into an appropriate mixer, such as a standard internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or a slab, in particular for laboratory characterization, or else extruded in the form of a rubber profiled element which can be used as a tread of tires used for heavy-duty vehicles.

BRIEF DESCRIPTION OF THE DRAWING

Further details and advantageous features of the invention will become evident hereinafter from the description of exemplary embodiments of the invention given with reference to the sole FIGURE which depicts a meridian view of a design of a tire according to a first embodiment of the invention.

For ease of understanding, the FIGURE is not drawn to scale. The FIGURE shows only a half-view of a tire which extends symmetrically about the axis XX' which represents the circumferential median plane, or equatorial plane, of a tire.

DETAILED DESCRIPTION OF THE ENABLING EMBODIMENT

In the FIGURE, the tire 1, of size 385/65 R 22.5, comprises a radial carcass reinforcement 2 anchored in two beads 3 around bead wires 4. The carcass reinforcement 2 is formed of a single layer of metal cords. The carcass reinforcement 2 is hooped by a crown reinforcement 5, itself capped by a tread 6. The tread comprises grooves that form ribs.

The low regions and the beads of the tire 1 are in particular not depicted in the FIGURE.

In the FIGURE, the crown reinforcement 5 is formed radially from the inside to the outside:

of a triangulation layer 51 formed of non-wrapped inextensible 9.35 metal cords which are continuous across the entire width of the ply and oriented at an angle of 65°, of a first working layer 52 formed of non-wrapped inextensible 11.35 metal cords which are continuous across the entire width of the ply and oriented at an angle of 18°, of a second working layer 53 formed of non-wrapped inextensible 11.35 metal cords which are continuous across the entire width of the ply, oriented at an angle of 18° and crossed with the metal cords of the first working layer, of a protective layer 54 formed of non-wrapped elastic 6.35 metal cords which are continuous across the entire width of the ply, oriented at an angle of 18° in the same direction as the metal cords of the working layer 53.

In accordance with the invention, the tread 6 consists of a radially outer first layer 61 which comes into contact with the ground and of a radially inner layer 62.

The layer 61 consists of a filled elastomeric compound M (as described below) and the layer 62 consists of a filled elastomeric compound T1, T2 or C1 (as described below).

The ratio of the volume of the layer 62 of the second elastomeric compound to the sum of the volumes of the layers 61 and 62 is equal to 42%.

The ratio of the thickness d62, measured in the radial direction at the end of the radially outermost working layer 53, of the layer 62 to the sum of the thicknesses d61 and d62, measured in the radial direction at the end of the working layer 53, the layers 61 and 62 is equal to 33%.

Three tires were produced based on the three elastomeric compounds described hereinbelow with some of their properties.

Preparation of the Rubber Compositions

The compositions M and T1 are produced according to a conventional compounding process (described below) in solid form in which the diene elastomer and the reinforcing filler are introduced in solid form.

The control rubber composition T2 not in accordance with the invention and the composition C1 in accordance with the invention are produced according to the compounding process described below but in which the diene elastomer and the reinforcing filler were prepared beforehand in the form of a masterbatch A.

The masterbatch A comprising natural rubber and a filler (carbon black, silica or black covered by silica) is produced in the liquid phase according to the process described in U.S. Pat. No. 6,048,923.

Thus, a masterbatch is prepared, according to the protocol explained in detail in the aforementioned patent, from an aqueous dispersion of filler and natural rubber field latex originating from Malaysia and having a rubber solids content of 28% and an ammonia content of 0.3%.

A masterbatch A of natural rubber and filler is thus obtained in which the filler content is 50 phr.

The compounding process used for the various compositions is as follows.

The tests below are carried out in the following manner: introduced into an internal mixer, filled to 70%, and the initial vessel temperature of which is around 90° C., are the masterbatch A for the compositions T2 and C1, or the natural rubber in solid form and the reinforcing filler for the compositions M and T1, followed, after kneading for one to two minutes, by the various other ingredients, with the exception of the vulcanization system. Thermomechanical working (non-productive phase) is then performed in one step (total kneading time equal to about 5 min), until a maximum "dropping" temperature of about 165° C. is reached.

The mixture thus obtained is recovered and cooled and then the vulcanization system (sulfur and sulfenamide accelerator) is added in an external mixer (homofinisher) at 70° C., by compounding everything (productive phase) for around 5 to 6 min. When a covering agent is present, this covering agent may also be introduced into the external mixer instead of being introduced into the internal mixer.

The compositions thus obtained are subsequently calendered, either in the form of slabs (thickness of 2 to 3 mm) or of thin sheets of rubber, for the measurement of their physical or mechanical properties, or in the form of profiled elements which can be used directly, after cutting and/or assembling to the desired dimensions, for example as semi-finished products for tires, in particular as tire treads.

Tests

The purpose of these tests is to demonstrate the significantly improved rolling resistance and wear properties of a tire in accordance with the invention, compared to control tires not in accordance with the invention, due to their formulation and/or their preparation process.

The rubber composition T1 is thus prepared "in bulk" and the compositions T2 and C1 are prepared from the masterbatch A; they differ from one another as follows:

composition T1, not in accordance with the invention, comprises a blend of carbon black and silica, composition T2, not in accordance with the invention, has a formulation identical to the composition T1, composition C1, in accordance with the invention, comprises a blend of silica and carbon black covered by silica as reinforcing filler.

The composition M is a conventional composition for a first tread layer of a "heavy-duty" tire.

The constituents of the compositions M, T1, T2 and C1 are presented in Table 1 below, in which the contents are indicated as parts by weight per hundred parts of elastomer, phr.

TABLE 1

| Composition | M | T1 | T2 | C1 |
|---|---|---|---|---|
| Natural rubber | 80 | 100 | 100 | 100 |
| SBR | 20 | — | — | — |
| Carbon black (1) | 42 | — | — | — |
| Carbon black (2) | — | 24 | 24 | — |
| Silica (3) | 10 | 18 | 18 | 7 |
| Black covered by silica (4) | — | — | — | 35 |
| Coupling agent (5) | 3.6 | 3.6 | 3.6 | 3.6 |
| Antioxidant (5) | | | | |
| Stearic acid | 2 | 2 | 2 | 2 |
| ZnO (7) | 3 | 3 | 3 | 3 |
| CBS (8) | 1 | 1 | 1 | 1 |
| Sulfur | 2 | 2 | 2 | 2 |

(1) N234 sold by Cabot Corporation
(2) N375 sold by Cabot Corporation
(3) Zeosil 1165MP precipitated silica, sold by Solvay
(4) CRX2125 sold by Cabot Corporation
(5) bis(3-triethoxysilylpropyl) tetrasulfide, TESPT, SI69, sold by Evonik
(6) N-(1,3-Dimethylbutyl)-N-phenyl-para-phenylenediamine, Santoflex 6-PPD, sold by Flexsys
(7) Industrial grade zinc oxide, sold by Umicore
(8) N-cyclohexyl-2-benzothiazolesulfenamide, Santocure CBS, sold by Flexsys The properties of these compositions measured after curing at 150° C. for 40 minutes are given in Table 2 below, as is the wear test carried out on tires comprising these compositions as tread.

TABLE 2

| Composition | T1 | T2 | C1 |
|---|---|---|---|
| Properties after curing | | | |
| Z value | 55 | 80 | 88 |
| Tan$\delta_{max\ return}$ | 0.083 | 0.057 | 0.055 |
| Wear test | | | |
| Wear performance | 100 | 98 | 107 |

It is observed, as expected, that the compositions T2 and C1 prepared from a masterbatch A produced in the liquid phase have a greatly improved dispersion of the filler in the elastomeric matrix compared to the composition prepared in bulk, T1.

It is also observed that the compositions T2 and C1, having a very good dispersion of the filler in the composition, have a significantly reduced hysteresis compared to the composition prepared in bulk, T1.

Furthermore, it is observed that for compositions based on carbon black or silica, the dispersion of the filler in the composition does not affect the wear performance of tires having treads consisting of these compositions (identical or virtually identical performance index between T1 and T2) while passing to composition C1 makes it possible, entirely surprisingly, to very significantly improve the wear resistance of the tire having a tread consisting of this composition C1.

Thus, an unexpected synergy is demonstrated for the combination of a filler covered by silica with its very good dispersion of the composition of the radially inner layer of a tread, for obtaining a tire for a heavy-duty vehicle that has both improved rolling resistance properties and improved wear resistance properties.

What is claimed is:

1. A tire having a radial carcass reinforcement configured to equip vehicles carrying heavy loads and running at sustained speed, comprising a crown reinforcement, itself capped radially with a tread joined to two beads via two sidewalls, said tread comprising at least two radially superposed layers of polymeric compound, a radially outer first layer that comes into contact with the ground and a radially inner second layer, wherein the second layer has a composition based on at least an elastomeric matrix comprising a diene elastomer, a reinforcing filler comprising predominantly a filler covered at least partially by silica, an agent for coupling the filler with the elastomer and a crosslinking system, wherein the dispersion of the filler in the elastomeric matrix having a Z value greater than or equal to 70, according to the method described by S. Otto et al. in Kautschuk Gummi Kunststoffe, 58 Jahrgang, NR 7-8/2005, in agreement with standard ISO 11345.

2. The tire according to claim 1, in which the tread comprises a third layer radially on the inside of the second layer, the third layer having a composition identical to or different from that of the second layer.

3. The tire according to claim 1, in which the filler covered at least partially by silica constitutes at least 60% by weight of the total reinforcing filler of the composition.

4. The tire according to claim 1, in which the filler covered at least partially by silica constitutes at least 80% by weight of the total reinforcing filler of the composition.

5. The tire according to claim 1, in which the filler covered at least partially by silica is selected from carbon black, metal hydroxides, and crosslinked polymer particles.

6. The tire according to claim 5, in which the filler covered at least partially by silica consists of carbon black.

7. The tire according to claim 1, in which the filler covered at least partially by silica is used with a content ranging from 25 to 90 phr in the composition.

8. The tire according to claim 1, in which the filler covered at least partially by silica is used in a blend with carbon black in the composition.

9. The tire according to claim 1, in which the filler covered at least partially by silica is used in a blend with silica in the composition.

10. The tire according to claim 8, in which the total content of reinforcing filler of the composition varies from 30 to 75 phr, the content of carbon black or of silica varying from 1 to 30 phr.

11. The tire according to claim 1, in which the diene elastomer of the composition is selected from the group consisting of polybutadienes, natural rubber, synthetic polyisoprenes, butadiene copolymers, isoprene copolymers and mixtures of these elastomers.

12. The tire according to claim 11, in which the diene elastomer is a natural rubber.

13. The tire according to claim 1, which comprises less than 15 phr of plasticizing agents.

* * * * *